United States Patent
Fodor et al.

(10) Patent No.: US 9,521,536 B2
(45) Date of Patent: Dec. 13, 2016

(54) DEVICE DISCOVERY OF SECOND USER EQUIPMENTS IN A SECOND NETWORK FOR D2D COMMUNICATION

(71) Applicant: Telefonaktiebolaget L M Ericsson (publ), Stockholm (SE)

(72) Inventors: Gabor Fodor, Hässelby (SE); Marco Belleschi, Solna (SE); Bengt Lindoff, Bjärred (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 47 days.

(21) Appl. No.: 14/400,975

(22) PCT Filed: Sep. 28, 2012

(86) PCT No.: PCT/SE2012/051042
§ 371 (c)(1),
(2) Date: Nov. 13, 2014

(87) PCT Pub. No.: WO2013/172755
PCT Pub. Date: Nov. 21, 2013

(65) Prior Publication Data
US 2015/0156619 A1    Jun. 4, 2015

Related U.S. Application Data

(60) Provisional application No. 61/646,922, filed on May 15, 2012.

(51) Int. Cl.
*H04W 8/00* (2009.01)
*H04W 92/20* (2009.01)
*H04W 72/04* (2009.01)

(52) U.S. Cl.
CPC .............. *H04W 8/005* (2013.01); *H04W 72/04* (2013.01); *H04W 92/20* (2013.01)

(58) Field of Classification Search
CPC ....... H04W 76/02; H04W 72/04; H04W 8/005
See application file for complete search history.

(56) References Cited

U.S. PATENT DOCUMENTS

| 2011/0258313 | A1 | 10/2011 | Mallik et al. | |
|---|---|---|---|---|
| 2011/0258315 | A1* | 10/2011 | Whitmore | H04L 41/0273 709/224 |
| 2011/0312330 | A1* | 12/2011 | Sadek | H04W 16/14 455/452.2 |

FOREIGN PATENT DOCUMENTS

| WO | WO/2011/116815 | * | 3/2010 | ............ H04W 72/04 |
|---|---|---|---|---|
| WO | WO/2011/147462 | * | 5/2010 | ............ H04W 76/02 |

(Continued)

OTHER PUBLICATIONS

International Search Report and Written Opinion of the International Searching Authority, PCT Application No. PCT/SE2012/051042, Jan. 16, 2013.

(Continued)

*Primary Examiner* — Myron K Wyche
(74) *Attorney, Agent, or Firm* — Myers Bigel, P.A.

(57) ABSTRACT

According to a first aspect of embodiments herein, a method in a first network node for handling device discovery of second user equipments in a second network for Device-to-Device (D2D) communication is provided. The network node is comprised in a first network. The first network node obtains information from a second network node within the second network. The information relates to resources for sending device discovery beacon signals in a second network. The first network node sends the obtained information to a first user equipment served by the first network node. The obtained information relates to said resources for sending device discovery beacon signals in the second network. The information enables the first user equipment to discover beacon signals from the second user equipments in the second network and/or to send beacon signals to be discovered by the second user equipments in the second network.

46 Claims, 10 Drawing Sheets

(56) References Cited

FOREIGN PATENT DOCUMENTS

| WO | WO 2011/116815 A1 | 9/2011 |
|----|---|---|
| WO | WO 2011/147462 A1 | 12/2011 |

OTHER PUBLICATIONS

Baccelli et al., "On the Design of Device-to-Device Autonomous Discovery", *2012 Fourth International Conference on Communications Systems and Networks (COMSNETS)*, Bangalore, Jan. 3-7, 2012, 9 pp.

Doppler et al., "Advances in D2D Communications: Energy efficient Service and Device Discovery Radio", *2011 2nd International Conference on Wireless Communication, Vehicular Technology, Information Theory and Aerospace & Electronic Systems Technology (Wireless VITAE)*, Chennai, Feb. 28-Mar. 3, 2011, 6 pp.

Doppler et al., "Device-to-Device Communication as an Underlay to LTE-Advanced Networks", *IEEE Communications Magazine*, Dec. 2009, pp. 42-49.

Fodor et al., "Design Aspects of Network Assisted Device-to-Device Communications", *IEEE Communications Magazine*, Mar. 2012, pp. 170-177.

Vigato et al., "Joint Discovery in Synchronous Wireless Networks", *IEEE Transactions on Communications*, vol. 59, No. 8, Aug. 2011, pp. 2296-2305.

Yu et al., "Power optimization of device-to-device communication underlaying cellular communication", *IEEE Conference on Communications (ICC '09)*, Dresden, Jun. 14-18, 2009, 5 pp.

\* cited by examiner

Fig. 2 Method in the first network node 111

Fig. 4 Method in the first user equipment

DEVICE DISCOVERY OF SECOND USER EQUIPMENTS IN A SECOND NETWORK FOR D2D COMMUNICATION

CROSS REFERENCE TO RELATED APPLICATIONS

This application is a 35 U.S.C. §371 national stage application of PCT International Application No. PCT/SE2012/051042, filed on 28 Sep. 2012, which itself claims priority to U.S. provisional Application No. 61/646,922, filed 15 May 2012, the disclosures and contents of both of which are incorporated by reference herein in their entirety. The above-referenced PCT International Application was published in the English language as International Publication No. WO 2013/172755 A1 on 21 Nov. 2013.

TECHNICAL FIELD

Embodiments herein relate to a first network node, a first user equipment, and methods therein. In particular, it relates to handling device discovery of second user equipments in a second network for D2D communication.

BACKGROUND

Communication devices such as User Equipments (UEs) are also known as e.g. terminals, mobile terminals, wireless terminals and/or mobile stations. User equipments are enabled to communicate wirelessly in a cellular communications network or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations. In the context of this disclosure, the expression Downlink (DL) is used for the transmission path from the base station to the user equipment. The expression Uplink (UL) is used for the transmission path in the opposite direction i.e. from the user equipment to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

Device-to-device (D2D) communications underlying a cellular infrastructure has been proposed as a means of taking advantage of the physical proximity of communicating devices, increasing resource utilization, and improving cellular coverage. Relative to the traditional cellular methods, there is a need to design new peer discovery methods, physical layer procedures, and radio resource management algorithms that help realize the potential advantages of D2D communications. Here the 3GPP Long Term Evolution system is used as a baseline for D2D design, review some of the key design challenges, and propose solution approaches that allow cellular devices and D2D pairs to share spectrum resources and thereby increase the spectrum and energy efficiency of traditional cellular networks. Simulation results illustrate the viability of the proposed design.

Device-to-device (D2D) communications in cellular spectrum supported by a cellular infrastructure holds the promise of three types of gains. The proximity of user equipments (UE) may allow for extremely high bit rates, low delays and low power consumption. The reuse gain implies that radio resources may be simultaneously used by cellular as well as D2D links, tightening the reuse factor even of a reuse-1 system. Finally, the hop gain refers to using a single link in the D2D mode rather than using both an uplink and a downlink resource when communicating via the access point in the cellular mode. Additionally, D2D communications may extend the cellular coverage and facilitate new types of wireless peer-to-peer services. However, D2D communications utilizing cellular spectrum poses new challenges, because relative to cellular communication scenarios, the system needs to cope with new interference situations. For example, in an orthogonal frequency division multiplexing (OFDM) system in which D2D communication links may reuse some of the OFDM time-frequency resources (physical resource blocks, PRB), intracell interference is no longer negligible. In addition, in multicell systems, new types of intercell interference situations have to be dealt with due to the undesired proximity of D2D and cellular transmitters and receivers. Interestingly, these new types of interference situations are intertwined with the duplexing scheme that the cellular network and the D2D link employ, and also depend on the spectrum bands and PRBs allocated to D2D links. For example, when a D2D link utilizes some of the cellular uplink PRBs, a transmitting cellular user equipment (UE) may cause much stronger interference to a receiving UE of a D2D pair in a neighbor cell than the interference caused to a radio base station in that same neighbor cell. Solution approaches to deal with this problem include power control, various interference avoiding multi-antenna transmission techniques that can be combined with proper mode selection which decides whether a D2D candidate pair should be communicating in D2D or in cellular mode and advanced (network) coding schemes. The key functions of D2D communications comprises peer discovery, physical layer procedures, such as synchronization and reference signal design, and various radio resource management functions including mode selection, scheduling, PRB allocation, power control, and intra- and intercell interference management. See "Design Aspects of Network Assisted Device-to-Device Communications" Gabor Fodor, Erik Dahlman, Gunnar Mildh, Stefan Parkvall, Norbert Reider, György Miklós and Zoltán Turányi, IEEE Communications Magazine March 2012.

In cellular network assisted Device-to-Device (D2D) communications, also referred to as D2D communications as a cellular underlay, user equipments in the vicinity of each other typically less than a few 10s of meters but sometimes up to a few hundred meters, can establish a direct radio link, also referred to as a D2D bearer. While user equipments communicate direct over the D2D bearer, they also maintain a cellular connection with their respective serving base station. In this way the cellular RAN can assist and supervise the user equipments in allocating time, frequency and code resources for the D2D bearer. Also, the cellular RAN controls mode selection, meaning that the cellular RAN decides whether the D2D pair should use the direct link or communication should take place via the base station. The RAN also sets the maximum power level that the D2D pair may use for the D2D bearer.

Thus the basic rationale for network assisted D2D communications is to take advantage of the short distances between user equipments, reuse cellular spectrum and at the same time to protect the cellular layer from potentially harmful interference caused by the D2D bearer.

Device discovery, also called neighbor discovery or peer discovery, is a procedure that allows devices in the vicinity of each other to detect one another. Existing solutions for device discovery assume that the devices operate in the same frequency band and/or that the devices are registered at the same cellular network operator.

Therefore, existing techniques do not support device discovery procedures for devices operating in the licensed spectrum bands of different cellular operators. As an example, using existing techniques, a device (Device A) operating in the licensed spectrum of Operator-A cannot discover another device (Device B) registered and operating in the network of Operator-B.

Thus, the problem to be solved is that devices served by different cellular operators cannot discover one another, even if operating in the physical proximity of each other.

This problem should be solved in such a fashion that can be acceptable by end users, operators and regulatory bodies.

Device discovery is a well-known and widely used component of many existing wireless technologies, including ad hoc and cellular networks. Examples include Bluetooth, several variants of the IEEE 802.11 standards suite, such as WiFi Direct. The key technique used by these standards is to use specially designed beacon signals that devices can broadcast so that nearby devices can detect the proximity of such beacon broadcasting devices.

Recently, device-to-device communications as an underlay to cellular networks have been proposed as a mean to take advantage of the proximity of communicating devices and at the same time to allow devices to enjoy a controlled interference environment. Various device discovery techniques applicable for devices in cellular spectrum have also been proposed recently. These techniques make use of various forms of network assistance, such as obtaining synchronization, peer discovery resources (PDR) or tuning other parameters of the discovery process.

For the situation when two devices are connected to the same NW, this allows for a very efficient way for devices to discover one another since the NW then tells the different devices when to send their respective beacon and when to listen for certain beacons corresponding to other devices in the vicinity.

Although device discovery for ad hoc networking type of technologies (Bluetooth, WiFi Direct, is a relatively mature technology, only very few existing techniques have been proposed and built for devices operating in cellular spectrum. Therefore, the vast majority of existing (i.e. described, disclosed or actually built) solutions assume D2D device discovery operation in unlicensed spectrum. In this case, the implicit assumption of device discovery has been that all devices transmit and listen to beacon or reference signals within the same frequency bands.

There are also a few disclosed solutions proposed for device discovery for devices operating in cellular spectrum. This type of D2D communications in general and D2D discovery in particular have been termed "D2D communications as an underlay of cellular networks". The basic assumption for this type of D2D communications has been similar to that of the ad-hoc type of communication, but now assuming that all devices operate in the same, e.g. licensed, spectrum bands.

SUMMARY

An object of embodiments is to provide a way to enhance D2D peer discovery service in network assisted D2D discovery scenarios, when user equipments operate in different networks.

According to a first aspect of embodiments herein, the object is achieved by a method in a first network node for handling device discovery of second user equipments in a second network for Device to Device, D2D, communication. The network node is comprised in a first network. The first network node obtains information from a second network node within the second network. The information relates to resources for sending device discovery beacon signals in a second network. The first network node then sends the obtained information to a first user equipment served by the first network node. The obtained information relates to said resources for sending device discovery beacon signals in the second network. The information enables the first user equipment to discover beacon signals from the second user equipments in the second network and/or to send beacon signals to be discovered by the second user equipments in the second network.

According to a second aspect of embodiments herein, the object is achieved by a method in a first user equipment for handling device discovery of second user equipments in a second network for Device to Device, D2D, communication. The first user equipment is served by a first network node. The first user equipment receives information from the first network node. The information relates to resources for sending device discovery beacon signals in the second network. The first user equipment listens to beacon signals according to the received information to discover beacon signals from the second user equipments in the second network, or the first user equipment sends beacon signals according to the received information to be discovered by the second user equipments in the second network.

According to a third aspect of embodiments herein, the object is achieved by a first network node for handling device discovery of second user equipments in a second network for Device to Device, D2D, communication. The first network node is comprised in a first network. The first network node comprises a processing circuit configured to obtain information from a second network node within the second network. The information relates to resources for sending device discovery beacon signals in a second network. The processing circuit is further configured to send the obtained information to a first user equipment served by the first network node. The obtained information relates to resources for sending device discovery beacon signals in the second network. The information enables the first user equipment to discover beacon signals from the second user equipments in the second network, and/or to send beacon signals to be discovered by the second user equipments in the second network.

According to a fourth aspect of embodiments herein, the object is achieved by, a first user equipment for handling device discovery of second user equipments in a second network for Device to Device, D2D, communication. The first user equipment is served by a first network node. The first user equipment comprises a processing circuit configured to receive information from the first network node. The information relates to resources for sending device discovery beacon signals in the second network. The processing circuit is further configured to listen to beacon signals according to the received information to discover beacon signals from the second user equipments in the second network, or send beacon signals according to the received information to be discovered by the second user equipments in the second network.

Embodiments herein allow user equipments to discover other user equipments that operate in networks other than the user equipment's network, without roaming into the other network. Likewise, embodiments herein allow user equipments to be discovered by user equipments of other networks than the user equipment's. Thereby, embodiments herein enhance the D2D peer discovery service in network assisted D2D discovery scenarios.

A further advantage is that the user equipments employing the embodiments herein use less beacon resources to broadcast their beacon signals.

Furthermore, embodiments herein lead to reduced user equipment energy consumption during the neighbor discovery process.

Yet another advantage is that neighbor discovery between user equipments served by different mobile operators takes less time, that is it enhances the user experience of the discovery process.

Yet another advantage is that an appropriate scheduling of beacon resources reduces the interference that the neighboring discovery procedure may produce.

BRIEF DESCRIPTION OF THE DRAWINGS

Examples of embodiments herein are described in more detail with reference to attached drawings in which.

DETAILED DESCRIPTION

A device discovery mechanism for devices operating in different spectrum bands, e.g. of different cellular operators is provided. According to some embodiments herein, operators exchange data that allow devices to use different bands for beacon transmission and reception and allow a first user equipment in a first network to capture beacon signals of a second user equipment in a second network.

Figure 1:
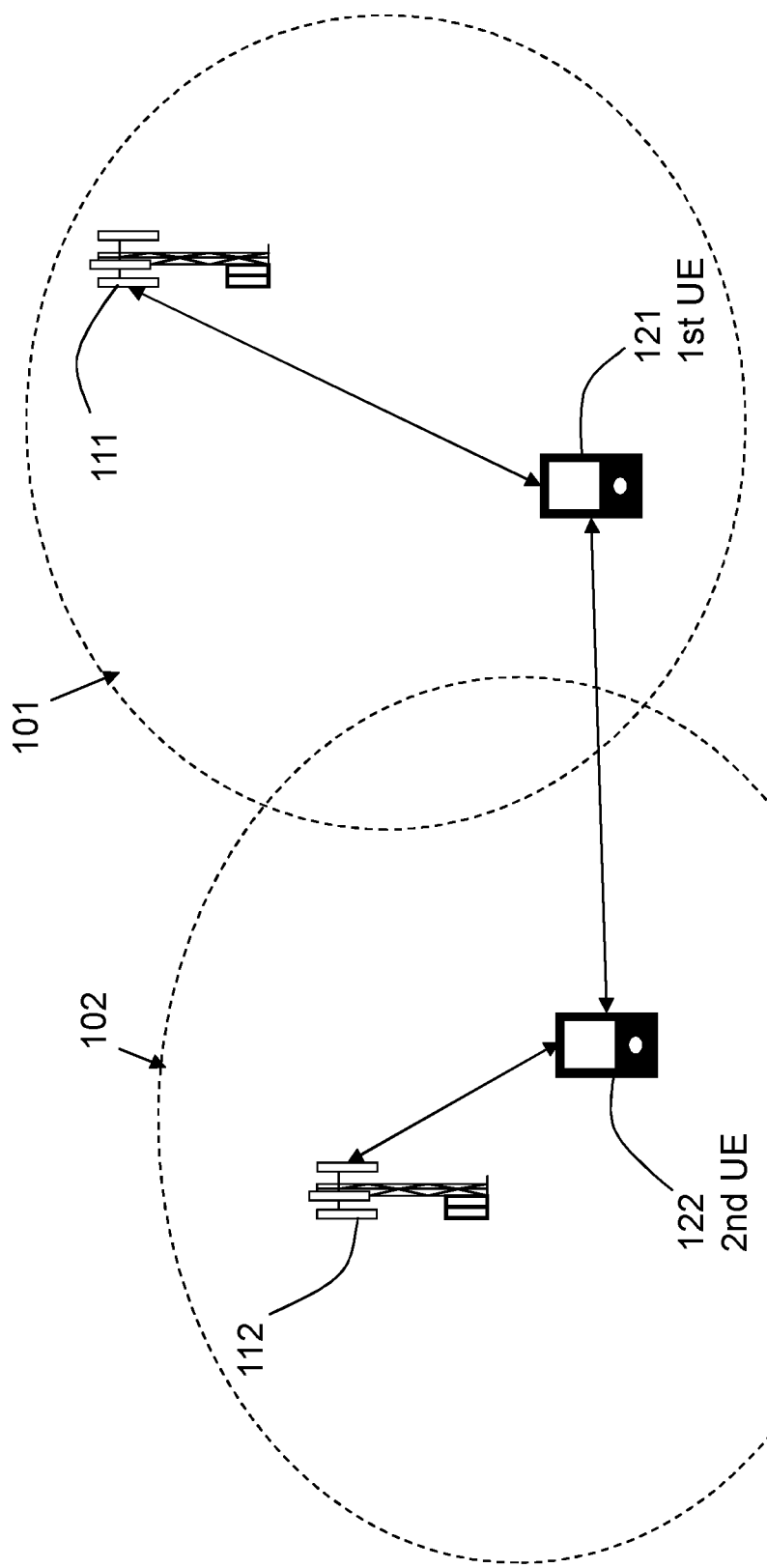
FIG. 1 is a schematic block diagram illustrating embodiments of networks.

FIG. 1 depicts a first network 101 and a second network 102 in which embodiments herein may be implemented. The first network 101 may be operated by a first operator, and the second network 102 may be operated by a second operator. The first operator may also be referred to as Operator-B, and the second operator may also be referred to as Operator-A. The first and second networks 101 and 102 may be wireless communication networks such as an LTE, WCDMA, UTRA TDD, GSM networks, GERAN networks, enhanced data rate for GSM evolution (EDGE) networks, any 3GPP cellular network, Wimax, or any cellular networks or systems. The first network 101 and the second network 102 operate in different spectrum bands and may use different radio access technologies.

The first cellular communications network 101 comprises a plurality of network nodes whereof one, a first network node 111 is depicted in FIG. 1. The first network node 111 may be a radio base station such as e.g. an eNB, an eNodeB, or a Home Node B, and Home eNode B or any other network node capable to serve a user equipment or a machine type communication device in a cellular communications network. The first network node 111 may further be a network entity such as a core network entity.

The second cellular communications network 102 comprises a plurality of network nodes whereof one, a second network node 112 is depicted in FIG. 1. The second network node 112 may be a radio base station such as e.g. an eNB, an eNodeB, or a Home Node B, and Home eNode B or any other network node capable to serve a user equipment or a machine type communication device in a cellular communications network. The second network node 112 may further be a network entity such as a core network entity.

A number of user equipments are located in the first respective second communications networks 101, 102. In the example scenario of FIG. 1, only two wireless devices are shown. One of them is a first user equipment 121 which is comprised in the first network 101 and which is served by the first network node 111. Further, one or more second user equipments 122 are comprised in the second network 102, and which is served by the second network node 112, whereof one second user equipment 122 is shown in FIG. 1. The first user equipment 121 and the second user equipment 122 are both capable to communicate using D2D communication.

The first user equipment 121 and the second user equipment 122 may e.g. be mobile terminals or wireless terminals, mobile phones, computers such as e.g. laptops, Personal Digital Assistants (PDAs) or tablet computers, sometimes referred to as surf plates, with wireless capability, machine devises or any other radio network units capable to communicate over a radio link in a wireless communications network.

User equipments such as the first user equipment 121 and the second user equipment 122 in FIG. 1, attempt to discover wireless devices in a radio range for e.g. communication or that can provide a given type of service. Radio range refers to the geographical area around a beacon signal transmitting user equipment within which the said beacon signal can be detected and decoded. The first user equipment 121 is capable of making use of some D2D technology to broadcast a beacon signal over a beacon channel (not shown) which may be received by a peer device such as the second user equipment 122, thereby enabling device discovery. Or vice versa, the second user equipment 122 is capable of making use of some D2D technology to broadcast a beacon signal over a beacon channel (not shown) which may be received by a peer such as the first user equipment 121, thereby enabling device discovery There may be multiple D2D technologies in operation which may carry a beacon signal 120. Possible options include 802.11 WLAN, Bluetooth, or a possible future D2D extension of LTE, ZigBee, IEEE 802.15, WiMax or other technologies such as the wireless sensor technology.

Figure 2:
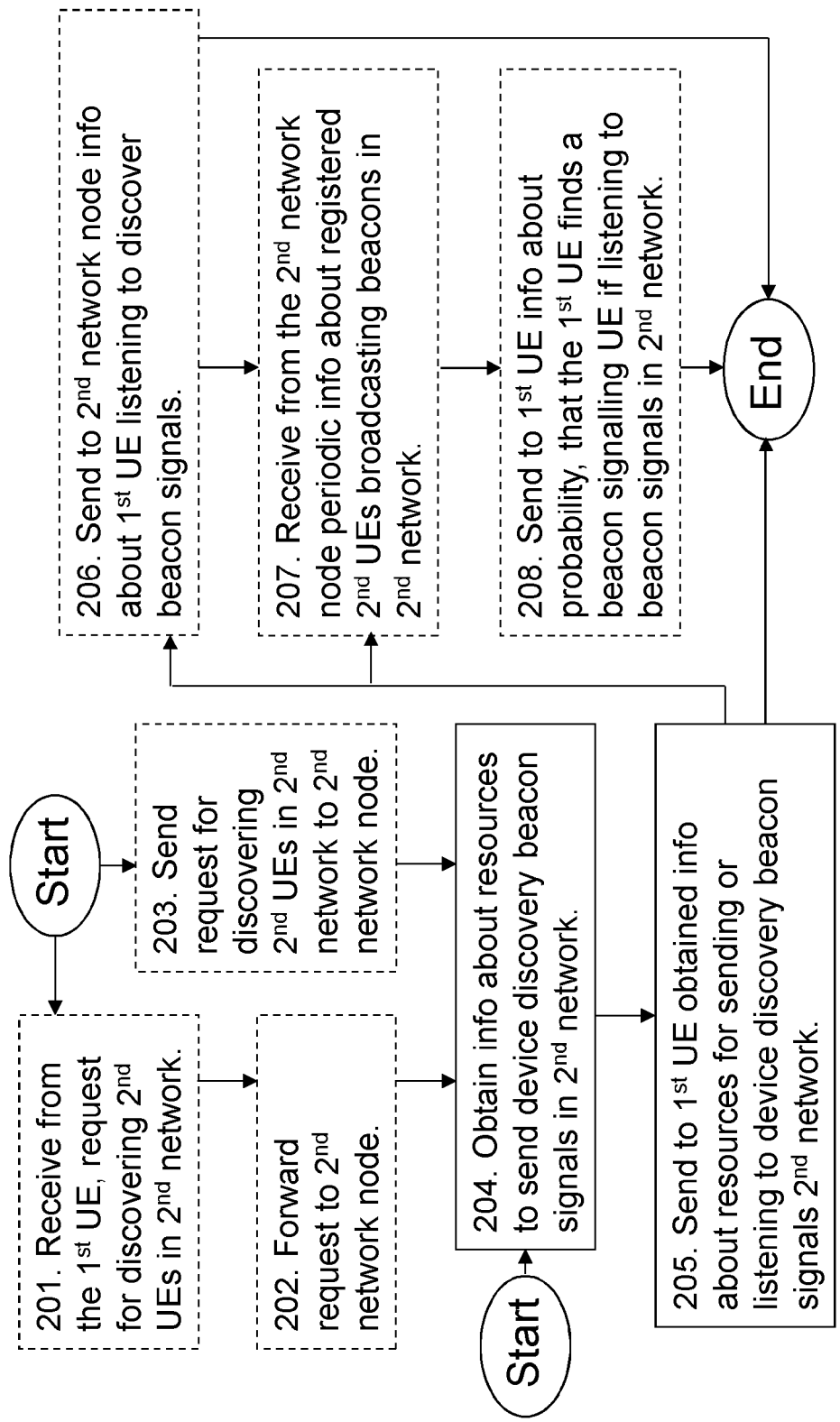
FIG. 2 is a flowchart depicting embodiments of a method in a first network node.

Embodiments herein describes an inter-operator device discovery procedure which may comprise following Actions:

Example of embodiments of a method in the first network node 111 for handling device discovery of the second user equipments 122 in the second network 102 for D2D communication will now be described with reference to a flowchart depicted in FIG. 2. Here the method is discussed seen from the perspective of the first network node 111.

The method comprises the following actions, which actions may be taken in any suitable order. Dashed lines of some boxes in FIG. 2 indicate that this action is not mandatory.

Action 201

According to the example scenario, the first user equipment 121 that would like to be able to discover services or user equipments belonging to and operating in other cellular networks, e.g. of the second operator, may register a request at its own serving network node 111. Therefore in some embodiments, the first network node 111 receives a request from the first user equipment 121. The request is a request for discovering second user equipments 122 in the second network 102. The request may be an "Inter-Operator Discovery (IOD) Request" at the first user equipment's 121 own serving network node 111 in the first network 101. This IOD Request may specify a specific Operator, e.g. the second operator, or may contain a wildcard indicating that the first user equipment 121 is interested in discovering all devices operating in any operator's network in the radio range of the first user equipment 121.

Action 202

In the embodiments where a request is received from the first user equipment 121, the first network node 111 may forward to the second network node 112 the request for discovering second user equipments 122 in the second network 102. The request may indicate a device identity of the first user equipment 121.

In some embodiments the request for information to the second network node 112 further indicates the number of registered, for example currently registered, user equipments in the first network 102 that have registered a request for discovering second user equipments 122 in the second network 102.

Action 203

As an alternative to action 201 and 202 first network node 111 may send the request to the second network node 112. This may thus be performed without receiving any request from the first user equipment 121. The request is a request for information about resources for sending device discovery beacon signals in the second network 102. As mentioned above, the second network node 112 is comprised in the second network 102.

In some embodiments the request for information to the second network node 112 further indicates the number of registered, for example currently registered user equipments in the first network 102 that have registered a request for discovering second user equipments 122 in the second network 102.

This action of sending the request for information to the second network node 112 may be performed periodically.

Action 204

In an example scenario, a first operator operates the first network 101 and a second operator operates the second network 102. Network entities of the first operator and the second operator exchange information on the resources that devices within their respective networks may use for broadcasting device discovery beacon signals. Therefore in this action, the first network node 111 obtains from the second network node 112 within the second network 102, information about resources for sending device discovery beacon signals in the second network 102.

The information may comprise resource description of any of time, frequency and code resources that the second user equipments 122 in the second network 102 use to transmit beacon signals. The specification of the time resources may for example make use of a system clock valid in that operator's network, i.e. the second network 102, such as a System Frame Number (SFN). Or it may use some globally valid clock reference, such as that provided by the Global Positioning System (GPS) or the combination of these two.

In some embodiments, the information comprises resource description of system frame numbers of frames in which the second user equipments 122 of the second network 102 send beacon signals. The information may further comprise specific physical resource blocks of a spectrum of the second network that the second user equipments 122 of the second network 102 use to transmit beacon signals.

This action of obtaining information from the second network node 112 may be performed periodically.

Action 205

The first network node 111 sends to the first user equipment 121 served by the first network node 111, the obtained information about resources for sending device discovery beacon signals in the second network 102. The information enables the first user equipment 121 to discover beacon signals from the second user equipments 122 in the second network 102, and/or to send beacon signals to be discovered by the second user equipments 122 in the second network 102.

The first network node 111 may provide the information to the first user equipment 121 via an "Inter-Operator Discovery (IOD) Acknowledgement" message. The IOD Acknowledgment message may comprise a list of structures, each structure containing a list composed by the Operator's ID and the description of neighbor discovery resources. As mentioned above, in the first operator may operates the first network 101 and the second operator may operate the second network 102.

By way of an example, the IOD Acknowledgment message may comprise the following list:

| i. | PLMN ID of Operator-A | < PRB Description > |
|---|---|---|
| ii. | PLMN ID of Operator-C | < PRB Description > |

PLMN is an abbreviation for Public Land Mobile Network. Operator-A and Operator C are also referred to as second operators. Therefore In these embodiments, the request may specify the second operator and the information sent to the first user equipment 121 may comprise the second operator's identity and a description of its resources for sending device discovery beacon signals.

The information about resources for sending device discovery beacon signals in the second network 102 relates to second user equipments 122 that that are in radio range of the first user equipment 122.

Action 206

The first network node 111 may inform the second network node 112 about the first user equipment's 121 currently listening, etc. Such information may e.g. comprise the capabilities of the first user equipment 121. This information may be useful for the second network 102 to construct or modify the beacon signal messages that are broadcasted by devices in the second network 102.

Therefore, in some embodiments, the first network node 111 sends to the second network node 112, information about the first user equipment 121 listening to discover beacon signals. The information about the first user equipment 121 may for example be about the user equipment capabilities of the first user equipment 121. The so called User Equipment (UE) capabilities is a known term in 3GPP and includes the capabilities of the user equipment in terms of what frequency bands it supports, what modulation and coding scheme it can use, what radio access technology RAT it supports, etc. In the future, the UE capability may be expected to include whether it can communicate in D2D mode or not. This information may be useful for the second network 102 to construct or modify the beacon messages that are broadcasted by devices in the second network 102.

Action 207

Optionally, the second network node 112 may send periodic information to the first network node 111 about the currently registered second user equipments 122 that are currently broadcasting beacon signals in the second network 102. This message allows the first network node to inform the first user equipment 122 about the current probability that the first user equipment 121 would find a master user equipment if the first user equipment 121 decides to "listen in" to the second network 102 of the second operator. Listening to beacon signals means that the receiver circuit of the listening device is configured to decode beacon signals that are broadcast or sent on the broadcast resources.

Thus, in some embodiments, the first network node 111 receives from the second network node 112 periodic information about the registered second user equipments 122 that are broadcasting beacon signals in the second network 102. This may e.g. be periodic information about the currently registered second user equipments 122 that are currently broadcasting beacon signals in the second network 102.

Action 208

Based on the received periodic information if such has been received, the first network node 111 may send to the first user equipment 121 the information about the probability, which may be the current probability, that the first user equipment 121 finds a beacon signalling user equipment if the first user equipment 121 decides to listen to beacon signals in the second network 102.

Figure 3:
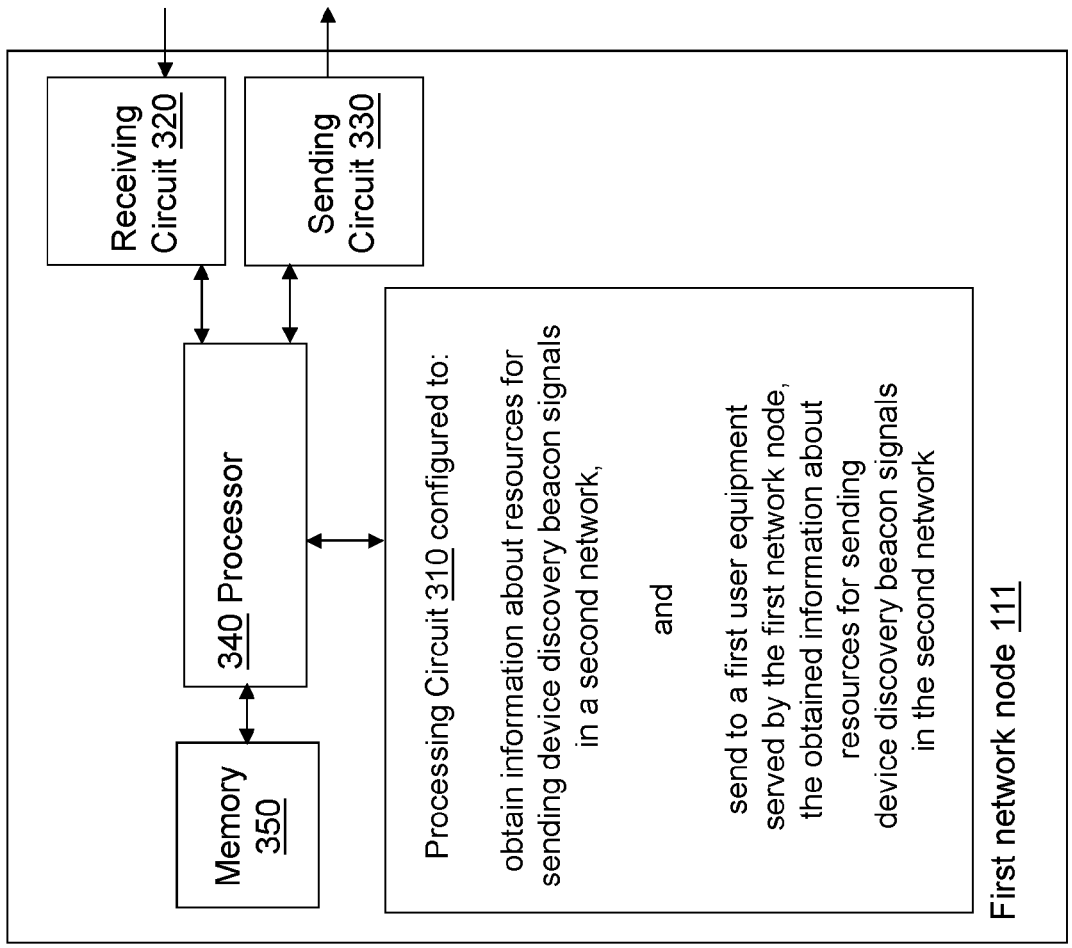
FIG. 3 is a schematic block diagram illustrating embodiments of a first network node.

To perform the method actions for handling device discovery of the second user equipments 122 in the second network 102 for D2D communication, the first network node 111 comprises the following arrangement depicted in FIG. 3.

The first network node 111 comprises a processing circuit 310 configured to obtain from a second network node 112 within the second network 102, information about resources for sending device discovery beacon signals in a second network 102, The information may comprise resource description of any of time, frequency and code resources that the second user equipments 122 in the second network 102 use to transmit beacon signals.

In some embodiments, the information comprises resource description of system frame numbers of frames in which the second user equipments 122 of the second network 102 send beacon signals and specific physical resource blocks of a spectrum of the second network that the second user equipments 122 of the second network 102 use to transmit beacon signals.

The information may further comprise resource description of system frame numbers of frames in which the second user equipments 122 of the second network 102 send beacon signals and specific physical resource blocks of a spectrum of the second network that the second user equipments 122 of the second network 102 use to transmit beacon signals.

The information about resources for sending device discovery beacon signals in the second network 102 may relate to second user equipments 122 that that are in radio range of the first user equipment 122.

The information may be received by a receiving circuit 320 comprised in the first network node 111.

The processing circuit 310 is further configured to send to the first user equipment 121 served by the first network node 111, the obtained information about resources for sending device discovery beacon signals in the second network 102. The information enables the first user equipment 121 to discover beacon signals from the second user equipments 122 in the second network 102, and/or to send beacon signals to be discovered by the second user equipments 122 in the second network 102.

The information may be sent by a sending circuit 330 comprised in the first network node 111.

The processing circuit 310 may further be configured to receive from the first user equipment 121, a request for discovering second user equipments 122 in the second network 102 and to forward to the second network node 112, the request for discovering second user equipments 122 in the second network 102. The request may indicate a device identity of the first user equipment 121.

The request for information to be sent to the second network node 112 may further indicate the number of registered user equipments in the first network 102 that have registered a request for discovering second user equipments 122 in the second network 102.

The request may be received by the receiving circuit 320.

In some embodiments, the processing circuit 310 is further configured to send to the second network node 112 a request for information about resources for sending device discovery beacon signals in the second network 102, wherein the second network node 112 is comprised in the second network 102.

The request for information to be sent to the second network node 112 may further indicate the number of registered user equipments in the first network 102 that have registered a request for discovering second user equipments 122 in the second network 102.

In some embodiments, the first operator operates the first network 101 and the second operator operates the second network 102. The request may in these embodiments specify the second operator. The information to be sent to the first user equipment 121 may comprise the second operator's identity and a description of its resources for sending device discovery beacon signals.

The request may be sent by the sending circuit 330.

In some embodiments, the information to be obtained from the second network node 112, or the request for information to be sent to the second network node 112 are performed periodically.

The processing circuit 310 may further be configured to send to the second network node 112, information about the first user equipment 121 listening to discover beacon signals. This may for example be about the user equipment capabilities of the first user equipment 121. The information may be sent by the sending circuit 330.

The processing circuit 310 may further be configured to receive from the second network node 112 periodic information about the registered second user equipments 122 that are broadcasting beacon signals in the second network 102, based on the received periodic information. The processing circuit 310 may further be configured to send to the first user equipment 121, information about the probability that the first user equipment 121 finds a beacon signalling user equipment if the first user equipment 121 decides to listen to beacon signals in the second network 102. The information may be received by the receiving circuit 320 and sent by the receiving circuit 320.

The embodiments herein for handling device discovery of second user equipments 122 in a second network 102 for D2D communication may be implemented through one or more processors, such as a processor 340 in the first network node 111 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the in the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 350 comprising one or more memory units. The memory 350 is arranged to be used to store requests, and information mentioned above. Further to store data, configurations, schedulings, and applications to perform the methods herein when being executed in the first network node.

Those skilled in the art will also appreciate that the processing circuit 310, the receiving circuit 320, and the sending circuit 330, described above may refer to a combination of analog and digital circuits, and/or one or more processors configured with software and/or firmware, e.g. stored in a memory such as the memory 350, that when executed by the one or more processors such as the processor 340 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 4:
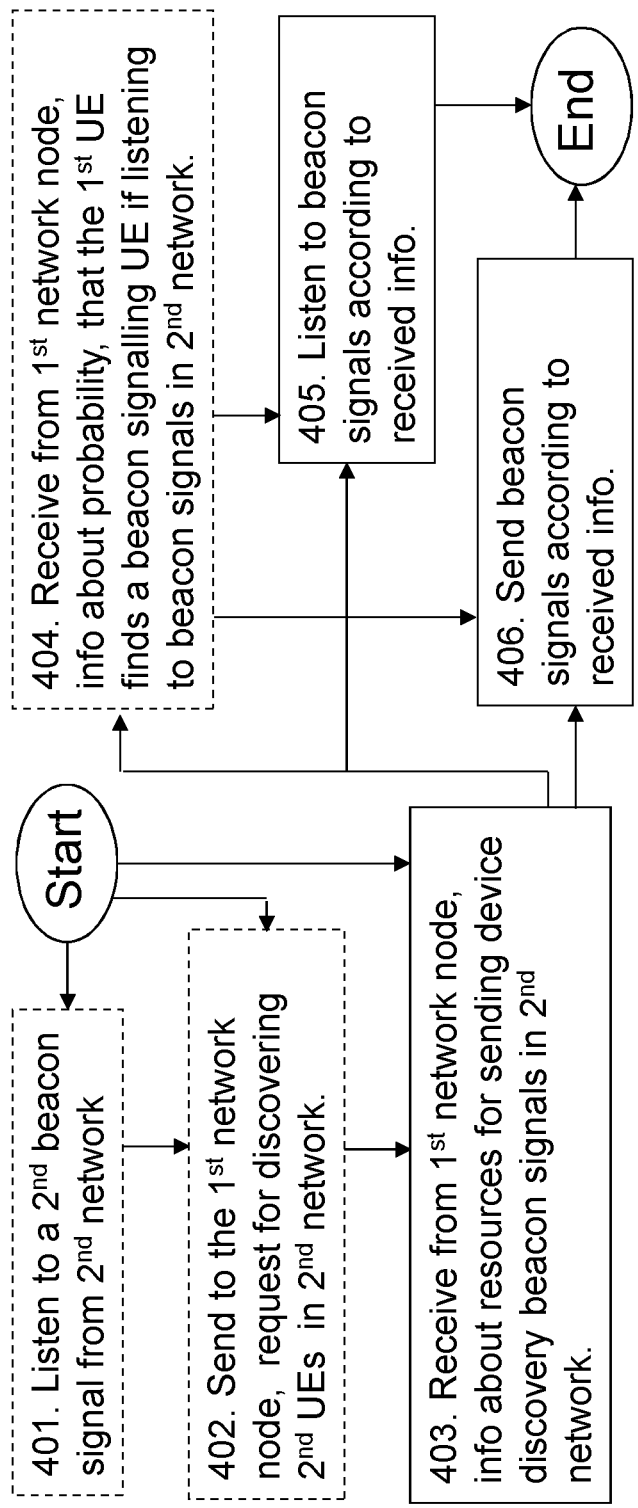
FIG. 4 is a flowchart depicting embodiments of a method in a first user equipment.

Example of embodiments of a method in the first user equipment 121 for handling device discovery of the second user equipments 122 in the second network 102 for D2D communication will now be described with reference to a flowchart depicted in FIG. 4. Here the method is discussed seen from the perspective of the first user equipment 121. As mentioned above, the first user equipment 121 is served by a first network node 111. The method comprises the following actions, which actions may be taken in any suitable order. Dashed lines of some boxes in FIG. 4 indicate that this action is not mandatory.

Action 401

This is an optional action. The first user equipment 121 may listen 401 to a second beacon signal from the second network 102. The second beacon signal may identify the presence or absence of second user equipments 122.

The second beacon signal may e.g. be sent by the second network node 112, or by the second user equipments 122 in the second network 102.

In some embodiments, this action is performed when the presence of second user equipments 122 have been identified in the second beacon signal.

As mentioned above, listening to beacon signals means that the receiver circuit of the listening device is configured to decode beacon signals that are broadcast or sent on the broadcast resources.

Action 402

The first user equipment 121 may send to the first network node 111, a request for discovering second user equipments 122 in the second network 102.

In some embodiments, the first operator operates the network 101 and the second operator operates the second network 102. The request may specify the second operator.

Action 403

The first user equipment 121 receives from the first network node 111, information about resources for sending device discovery beacon signals in the second network 102.

The information may comprise resource description of any of time, frequency and code resources that the second user equipments 122 in the second network 102 use to transmit beacon signals.

In some embodiments, the information comprises resource description of system frame numbers of frames in which the second user equipments 122 of the second network 102 send beacon signals and specific physical resource blocks of a spectrum of the second network that the second user equipments 122 of the second network 102 use to transmit beacon signals.

The information about resources for sending device discovery beacon signals in the second network 102 may relate to second user equipments 122 that that are in radio range of the first user equipment 122.

Action 404

The first user equipment 121 receiving 404 from the first network node 111, information about the probability, for example current probability, that the first user equipment 121 finds a beacon signalling user equipment if the first user equipment 121 decides to listen to beacon signals in the second network 102.

Action 405

The first user equipment 121 listens to beacon signals according to the received information to discover beacon signals from the second user equipments 122 in the second network 102.

Action 406

The first user equipment 121 sends beacon signals according to the received information to be discovered by the second user equipments 122 in the second network 102. This means that the first user equipment 121 may use the information for sending beacon signals, as in action 405, or for receiving beacon signals as in this action.

The information received from the first network node 111 may further comprise the second operator's identity and a description of its resources for sending device discovery beacon signals. This action of sending the beacon signals may be performed by repeatedly transmitting the beacon signals according to a pattern.

Figure 5:
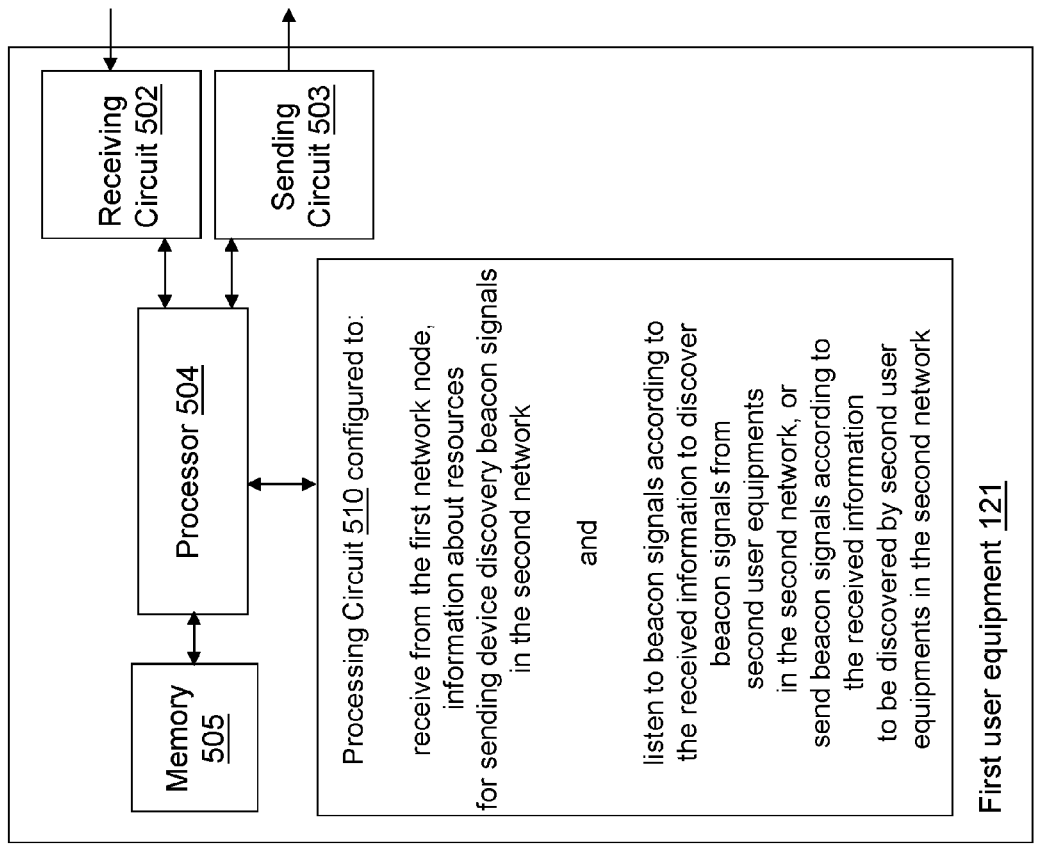
FIG. 5 is a schematic block diagram illustrating embodiments of a first user equipment.

To perform the method actions for handling device discovery of second user equipments 122 in a second network 102 for D2D communication, the first user equipment 121 comprises the following arrangement depicted in FIG. 5. As mentioned above, the first user equipment 121 is served by a first network node 111.

The first user equipment 121 comprises processing circuit 510 configured to receive from the first network node 111, information about resources for sending device discovery beacon signals in the second network 102.

The information may comprise resource description of any of time, frequency and code resources that the second user equipments 122 in the second network 102 use to transmit beacon signals.

In some embodiments, the information comprises resource description of system frame numbers of frames in which the second user equipments 122 of the second network 102 send beacon signals and specific physical resource blocks of a spectrum of the second network that the second user equipments 122 of the second network 102 use to transmit beacon signals.

The information about resources for sending device discovery beacon signals in the second network 102 may relate to second user equipments 122 that that are in radio range of the first user equipment 122.

The information may be received by a receiving circuit 520 comprised in the first user equipment 121.

The processing circuit 510 is further configured to listen to beacon signals according to the received information to discover beacon signals from the second user equipments 122 in the second network 102, or send beacon signals according to the received information to be discovered by the second user equipments 122 in the second network 102.

The beacon signals may be received by the receiving circuit 520 or be sent by a sending circuit 530 comprised in the first user equipment 121.

The processing circuit 510 may further be configured to send to the first network node 111 a request for discovering second user equipments 122 in the second network 102.

In some embodiments, the first operator operates the network 101 and the second operator operates the second network 102. In these embodiments, the request may specify the second operator.

The information received from the first network node 111 may comprise the second operator's identity and a description of its resources for sending device discovery beacon signals, and wherein the processing circuit 510 further is configured to send the beacon signals by repeatedly transmitting the beacon signals according to a pattern.

The request may be sent by the sending circuit 530.

The processing circuit 510 may further be configured to receive from the first network node 111, information about the probability, for example current probability that the first user equipment 121 finds a beacon signalling user equipment if the first user equipment 121 decides to listen to beacon signals in the second network 102.

The information may be received by the receiving circuit 520.

The processing circuit 510 may further be configured to listen to a second beacon signal from the second network 102. The second beacon signal identifies the presence or absence of second user equipments 122. When presence of second user equipments 122 has been identified, the processing circuit 510 may be configured to perform to send the request for discovering second user equipments 122 in the second network 102.

The second beacon signal may be sent by the second network node 112 or by the second user equipments 122 in the second network 102.

The second beacon signals to listen to, may be received by the receiving circuit 520.

The embodiments herein for handling device discovery of second user equipments 122 in a second network 102 for D2D communication may be implemented through one or more processors, such as a processor 540 in the first user equipment 121 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the first user equipment 121. One such carrier may be in the form of a CD ROM disc. It is however feasible with other data carriers such as a memory stick. The computer program code may furthermore be provided as pure program code on a server and downloaded to the first user equipment 121.

The first user equipment 121 may further comprise a memory 550 comprising one or more memory units. The memory 550 is arranged to be used to store requests, and information mentioned above. Further to store data, configurations, schedulings, and applications to perform the methods herein when being executed in the first user equipment 121.

Those skilled in the art will also appreciate that the processing circuit 510, the receiving circuit 520, and the sending circuit 530, described above may refer to a combination of analog and digital circuits, and/or one or more processors configured with software and/or firmware, e.g. stored in a memory such as the memory 550, that when executed by the one or more processors such as the processor 540 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Some of the embodiments above will be further discussed and explained in relation to the scenarios and figures below.

Please note that in this document and the figures:

The first network 101 may be referred to as the Network B.

The second network 102 may be referred to as the Network A.

The first user equipment 121 may be referred to as UE-B 121 or UB 121

The second user equipment 122 may be referred to as UE-A 122 or UA 122

The first operator may be referred to as Operator-B.

The second operator may be referred to as Operator-A

The first network node 111 may be referred to as Network B, as the network entity of Network B or as eNB-B.

The second network node 112 may be referred to as Network A, as the network entity of Network A, or as eNB-A.

Figure 6:
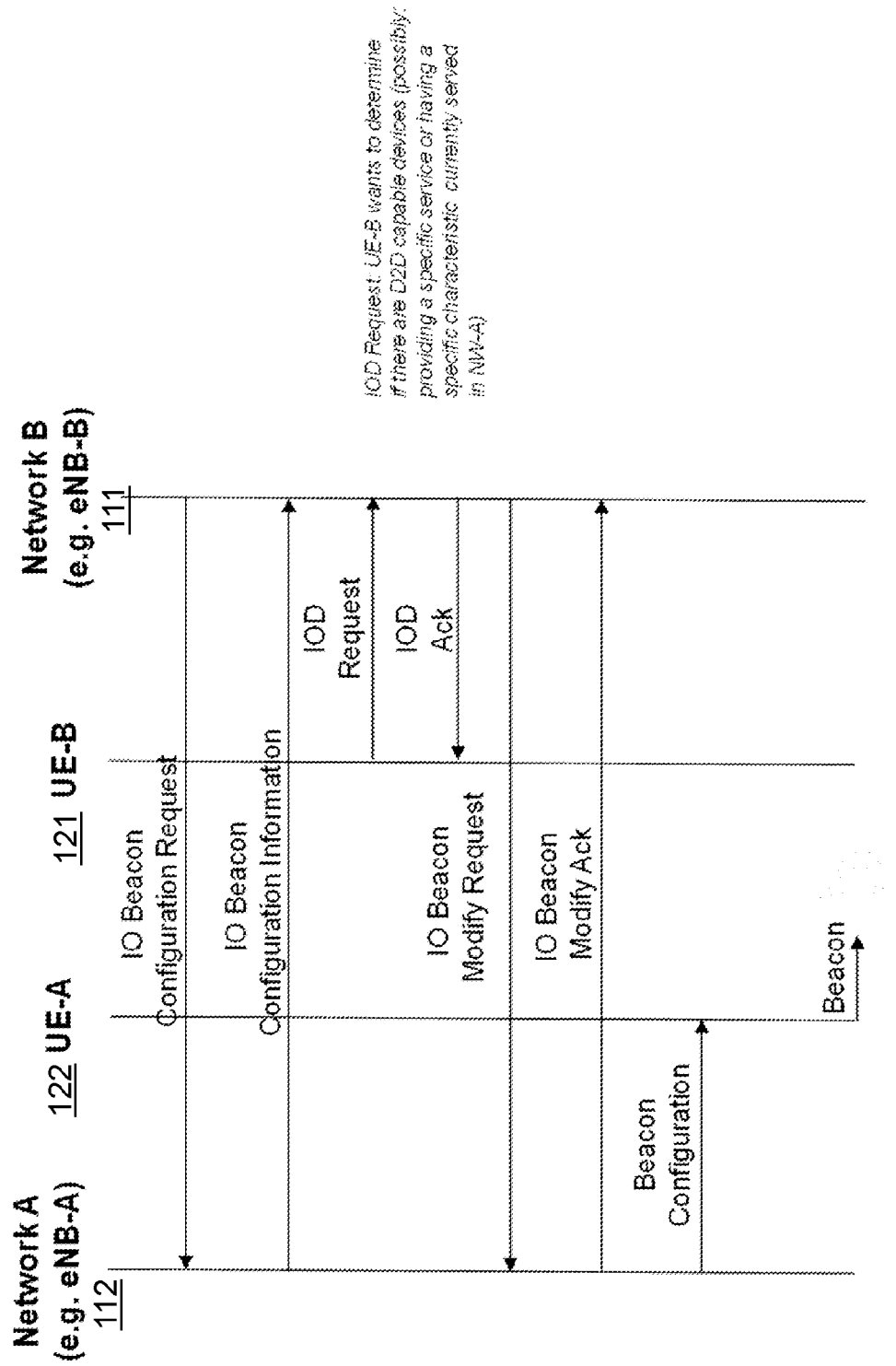
FIG. 6 is a schematic signalling scheme illustrating embodiments herein.

FIG. 6 depicts embodiments of the method of inter-operator network assisted D2D discovery illustrated in terms of signaling messages.

To illustrate some embodiments, consider the following steps:

As discussed above, one step of the device discovery procedure is the information exchange that takes place between the first network 101 and the second network 102, i.e. the first network node 111 and the second network node 112. It may be assumed that the first and second network nodes 111, 112 are the respective base stations, but other network entities such as core network entities could also play the role of the first network node 111 that exchanges information with the second network 102, e.g. of the second operator, or vice versa.

The first network node 111 may send an "Inter-Operator Beacon Configuration Request" message to the second network node 112. As a default, this message does not contain any parameters. Alternatively and optionally, this message may comprise a list of parameters that the first network node 111 inquires the second network node 112 about. For example, the second network node 112 may specify the time, frequency resources that the second user equipments 122 in the second network 102 use for beacon transmission. Further such parameters may comprise specific coding structures, e.g. Zadoff-Chu or Reed-Muller encoding details, transmit power levels used for beacon signalling, etc. This message may be sent periodically e.g. with a very low frequency, such as 1/minute, and it may also optionally contain an indicator of the number of currently registered first user equipments 121 for inter-operator discovery, or the complete list of currently registered first user equipments 121.

The second network node 112 may send an "Inter-Operator Beacon Configuration Information" message to the first network node 111. This message may have a default parameter set that describes the time and frequency resources that are currently used for beacon signaling by master user equipments, such as e.g. the second user equipments 122 in the second network 102. This message may comprise other parameters that characterize the beacon transmissions, such as frequency hopping patterns, used beacon power levels and other parameters needed for beacon construction and detection, such as Zadoff-Chu parameters. Optionally, the second network node 112 may send information about the currently active/registered masters and the type of service/content they are available to offer/share.

This message may be sent periodically, e.g. with a very low frequency, such as 1/minute, to the first network node 111, to provide information about the currently active second user equipments 122 advertising, e.g. broadcasting beacon signals, in the second network 102. The first network node 111 may in turn broadcast e.g. with a very low frequency, such as 1/minute, a bit. The bit indicates whether inter-operator user equipments, that is second user equipments 122, in the second network 102, that would like to be discovered by the first user equipment and the user equipments in the first network 101 are currently present in second network 102 or not.

This relates to action 204 above.

The first user equipment 121 may send an "Inter-Operator Discovery Request" message to its serving first network node 111 The first user equipment 121 may include a list of Operators, e.g. PLMN identities. Alternatively, the first user equipment 121 may leave the operator list parameter empty. This message may also include the type of service or content that the first user equipment 121 would like to be provided with. This relates to action 201 and 402 above.

The first network node 111 may decode the IOD request and send an "IO Beacon Modify Request" to the second network 102 if the second user equipments 122 in the second network 102 are able to provide the service or content required. A Beacon Modify Request is a request to use different characteristics of the broadcast beacon signal in terms of used resources, encoding scheme or transmit power. For example, a Beacon Modify Request may request the user equipment broadcasting beacon signals to change the time- and frequency resources and/or the encoding scheme of the beacon signal that the broadcasting user equipment should use.

If none of neighboring operators are able or allowed to provide the service or content required, the first network node 111 may send an "IOD Ack" indicating D2D rejection to the first user equipment 121.

As a response to the "IO Beacon Modify Request", the second network node 112 may send an "IO Beacon Modify Ack" indicating one or more of a set of time and frequency parameters, e.g. SFN, a list of resource elements, subcarriers, time slots, specific OFDM symbols, frequency hop characteristics, that characterize beacon transmissions of those second user equipments 122 in the second network 102 that are able to provide the service or content required.

A Beacon Configuration message may be sent by second network node 112 to those second user equipments 122 in the second network 102 that are able to provide the service or content required by the first network 101.

As a response to the "IOD Request" and to the "Beacon Modify Ack" messages, the first network node 111 may send an "IOD Acknowledgment" message to the first network node 121. The message may for instance be a table that comprises a list of parameters associated with the second network 102. This list of parameters preferably comprises time and frequency parameters such as e.g. one or more of, e.g. SFN, list of resource elements, subcarriers, time slots, specific OFDM symbols, frequency hop characteristics. This list may comprise other elements, e.g. part of the information that is broadcasted in a cellular Broadcast CHannel (BCH) of the second network 102. An example of such a cellular broadcast channel is the 3GPP Long Term Evolution (LTE) systems downlink Physical Broadcast Channel, known as PBCH in the LTE standards.

Figure 7:
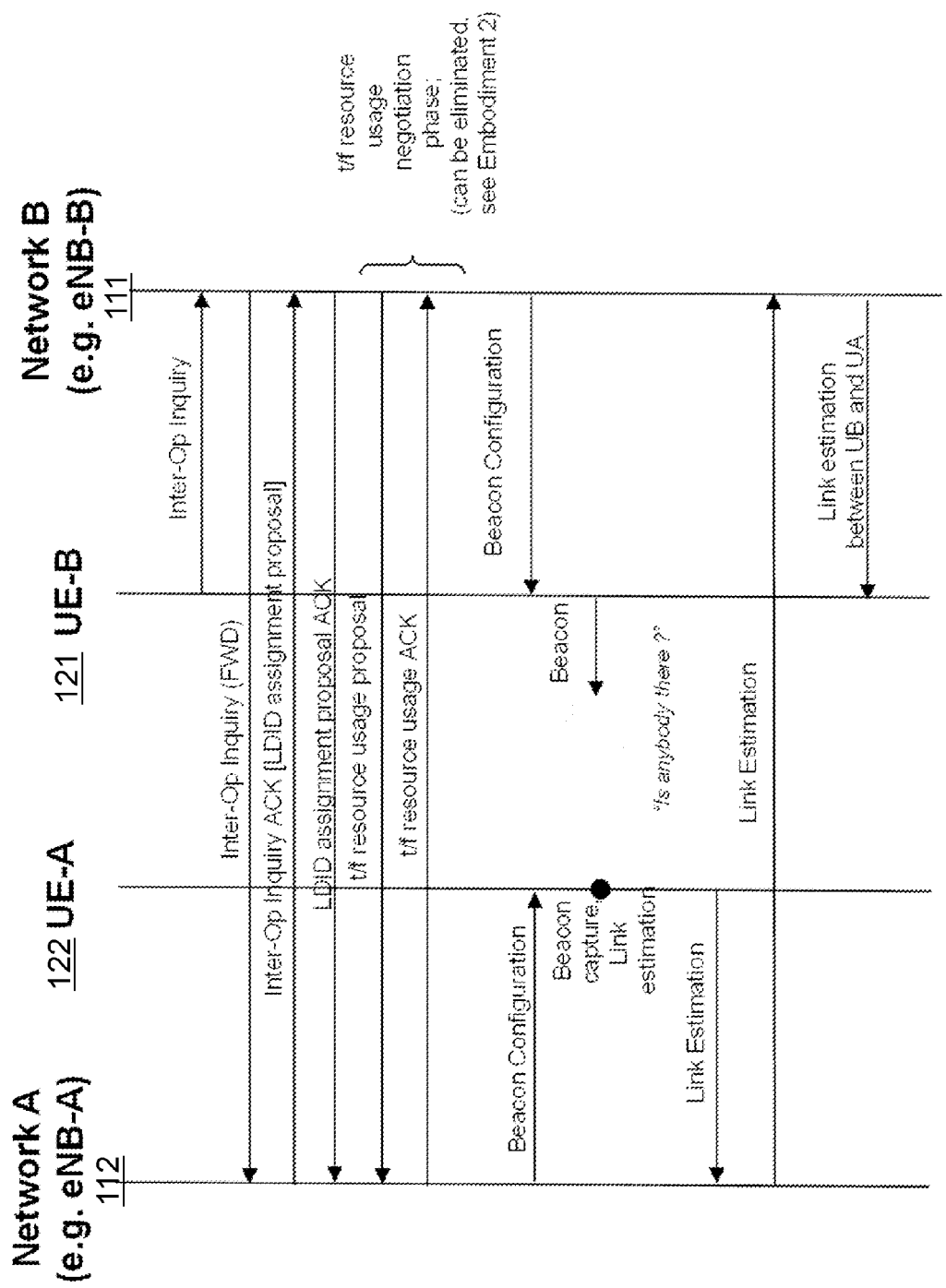
FIG. 7 is a schematic signalling scheme illustrating embodiments herein.

In some first embodiments, depicted in FIG. 7, the first user equipment 121 may signal a request to the first network node 111 of the first operator, which forwards this request to the second network node 112 of the second operator. This relates to action 201, 202 and 402 above. Preferably, when the first network node 111 of the first operator forwards this request, the first network node 111 of the first operator may also indicate the LDID(s) used by the first user equipment 121. In this way, the second network node 112 of the second operator may assign the same LDID to this device, i.e. the first user equipment 121 with the exception of the network specific part which is changed. Upon completion, first network node 111 of the first operator informs the first user equipment 121 about the request being successfully accepted by the second network node 112 of the second operator.

According to some embodiments, the LDIDs which are allocated by the different networks have one part, for instance the first byte, which is network specific, and a remaining part which might be allocated more arbitrary. Preferably, the different networks which are geographically overlapping may then assign LDIDs to a specific device which only differs in the network specific part.

In the message exchange between the two operators, i.e. the first network node 111 and the second network node 112, information about how to transmit the beacon by the first user equipment 121 may also be exchanged. As an example, a specific time and frequency resource might be agreed. This specific time and frequency resource is then communicated to the first user equipment 121 by the first network node 111 of the first operator and to the second user equipment 122 by the second network node 112 of the second operator. It shall be noted that there might be a large number of second user equipments 122 belonging to the second operator which are possible targets for D2D communications, so whereas the information from the first network node 111 of the first operator is only to one device, the information from the second network node 112 of the second operator may typically be broadcasted to all D2D capable devices, i.e. second user equipments 122 belonging to the second network 102.

In these embodiments, the time and frequency resource is in the spectrum controlled by the first network node 111 of the first operator. The devices, i.e. second user equipments 122, belonging to the second network 102, therefore needs to shift to this frequency. The first user equipment 121 then transmits its beacon in the time and/or frequency resource, and the second user equipments 122 belonging to the second operator listens. In some embodiments, the beacon characteristics are set prior to the beacon signal transmitting operation by an Operation and Maintenance (O&M) system, a core network node or a RAN node. Although the roles may be reversed, this approach has the advantages that only one beacon needs to be transmitted in order to estimate a potential large number of links, the links to all potential second user equipments 122 belonging to the second operator and which are D2D capable. In addition, it means that the beacon signal is transmitted in the spectrum which is controlled by the corresponding operator, the first operator in this case.

The transmission of the beacon, the reception of the same, as well as the estimation of the link quality (e.g. path loss) between different user equipments is then performed. E.g., the second user equipments 122 belonging to the second operator reports the received power, or alternatively the estimated path-loss, which is forwarded from the second network node 112 of the second operator to the first network node 111 of the first operator, and finally forwarded to first user equipment 121.

In some embodiments, targeted to minimize the required signaling, the beacon signal is not only transmitted at one specific time and/or frequency resource, but repeatedly transmitted according to some predetermined pattern, for instance on the same set of frequencies by for example, an interval of 100 ms. A similar procedure as in the previous embodiments may then be applied, but now there may be no need for negotiating of suitable time and/or frequency resource to use. Instead, the second network node 112 of the second operator informs the D2D capable second user equipments 122 belonging to the second operator to scan for the specific beacon some time during these 100 ms (milliseconds), whatever times is most convenient. After the scanning, the same procedure is conducted in order to get the information to the first user equipment 121. This relates to action 406 above.

Figure 8:
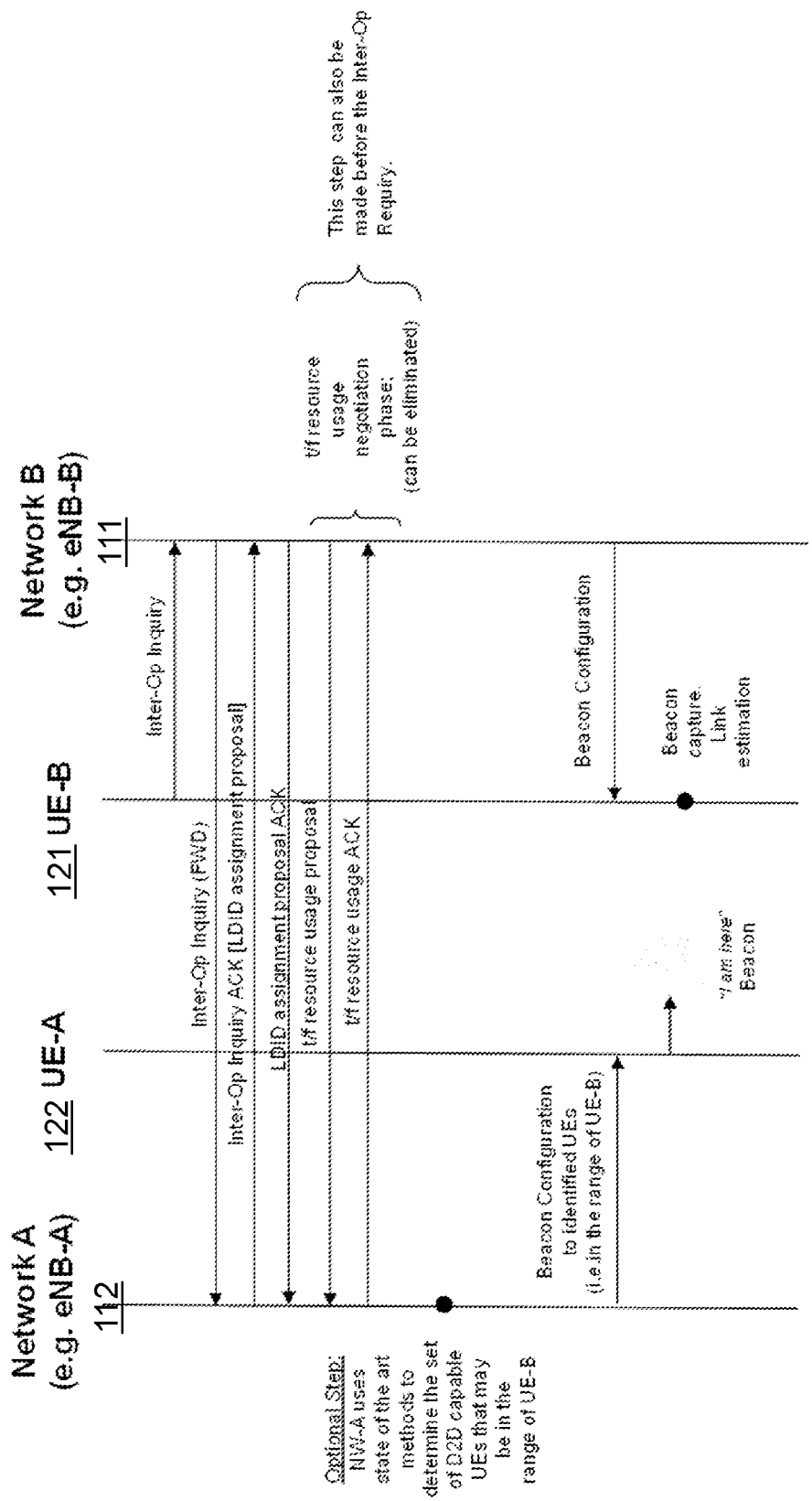
FIG. 8 is a schematic signalling scheme illustrating embodiments herein.

In some embodiments depicted in FIG. 8, the second network node 112 of the second operator identifies which D2D capable devices in its network might be in range of first user equipment 121. This might imply that second network node 112 of the second operator identifies all D2D capable devices, no devices at all, or devices which are known to be in a certain geographical region which to some extent overlaps with the coverage area of the first operator. The identified devices, i.e. the second user equipments 122 may then be requested to transmit a beacon at certain time and/or frequency resources, the beacon signals preferably derived from the identity of the respective second user equipment 122, but it may also be a common beacon signal. In any event, information about the time and/or frequency resources allocated to the beacon signals and the corresponding beacon signals are communicated to the first user equipment 121 from the second network node 112 of the second operator via the first network node 111 of the first operator. This relates to action 205 and 403 above. At the predetermined time and/or frequency resources, i.e. according to the obtained information, the first user equipment 121 listens for the corresponding beacon signals. Also in this case the user equipment which transmits a beacon, i.e. the second user equipments 122 does transmit it in the spectrum controlled by the corresponding operator, in this case the second operator's spectrum. However, in this embodiment one beacon needs to be transmitted for every possible D2D link to be estimated. It should be emphasized that the time and/or frequency resources allocated for transmitting the beacon signals may be non-overlapping (orthogonal), or all beacon signals might be transmitted in the same time and/or frequency resource, or the beacon signals might be partitioned in some other way among the time and/or frequency resources.

In case the beacon signals are transmitted in orthogonal resources, the overhead may be prohibitively large in case there are many user equipments. If instead all user equipments are transmitting using the same time and/or frequency resource, the overhead is minimized. However, this means that the first user equipment 121 needs to be able to reliably distinguish all beacon signals and determine the corresponding signal strength although the different beacon signals at the receiver might interfere with one another.

Figure 9:
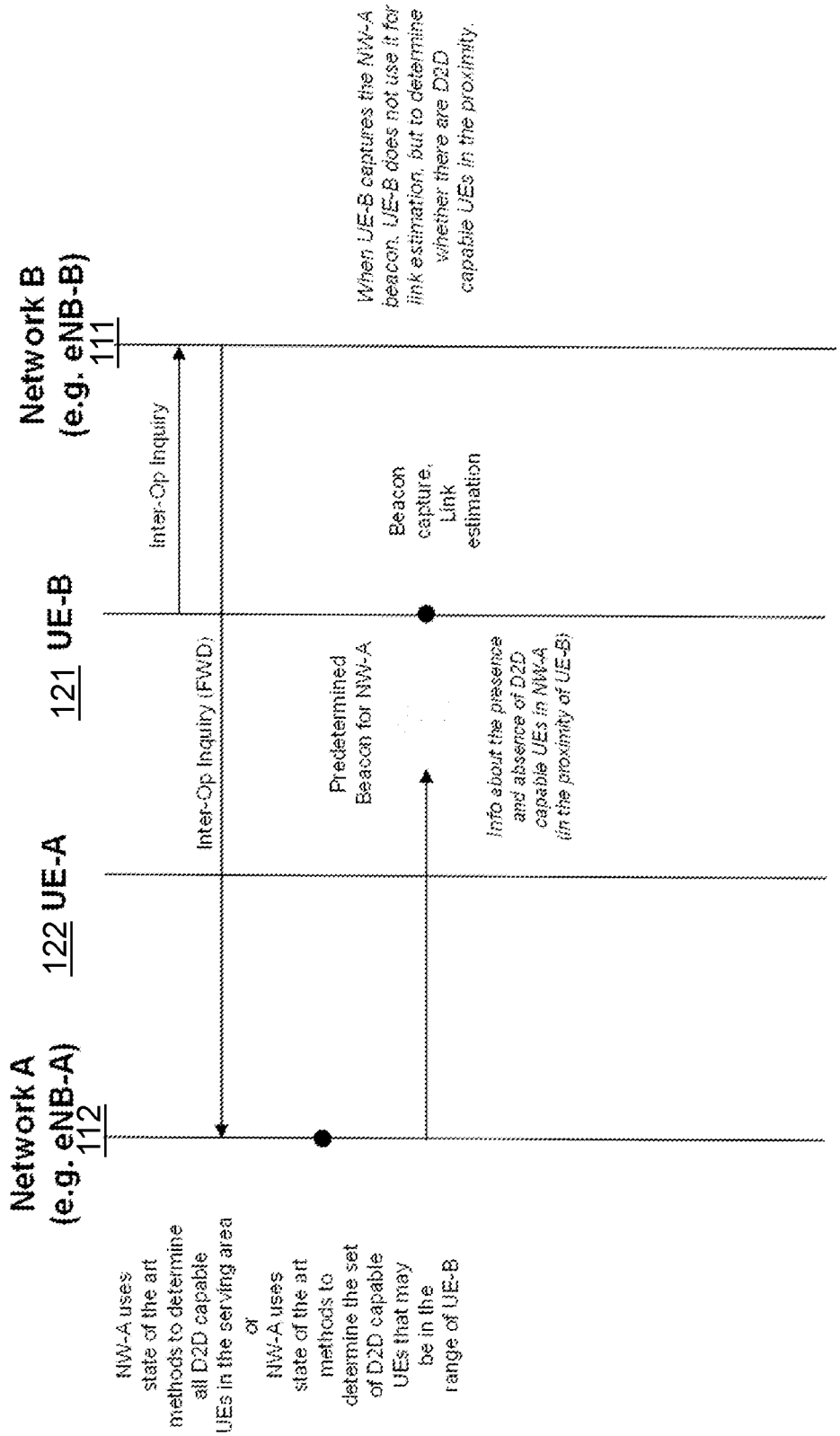
FIG. 9 is a schematic signalling scheme illustrating embodiments herein.

Since there may be situations when the second operator has no second user equipment 122 which is D2D capable, or no D2D capable second user equipment 122 within a certain area of the second network 102, it would be desirable if such a situation could be easily identified in order to minimize the amount of unnecessary signaling. This is addressed in some embodiments depicted in FIG. 9. In these embodiments, there is a pre-defined beacon signal which is used to identify the presence or absence of D2D capable devices. Preferably, but not necessary, such a beacon signal is constructed such that one part is unique for the operator and another part is common for all operators. Suppose that such a beacon signal is transmitted, and furthermore suppose that the first user equipment 121 knows the network specific part corresponding to the second operator, which means that the first user equipment 121 knows exactly what this beacon looks like. Knowledge of the operator specific part might for instance be obtained already when registering to the first network node 111 of the first operator as part of the neighbor list information. Now, before the first user equipment 121 starts to search for possible devices for a D2D connection, it listens to the second network node 112 of the second operator and in particular it listens for the predetermined beacon signals indicating presence and/or possibly absence of D2D capable devices, i.e. second devices 122. Based on the detection of these beacon signals, the first user equipment 121 may determine if there is any second device 122 for potential D2D communications. If it is determined that there is no such device, no more action may be performed, whereas in case it is determined that there may in fact be a D2D capable second device 122 in range of the first user equipment 121, a discovery procedure according to any of the above embodiments is initiated. This relates to action 401 above.

Figure 10:
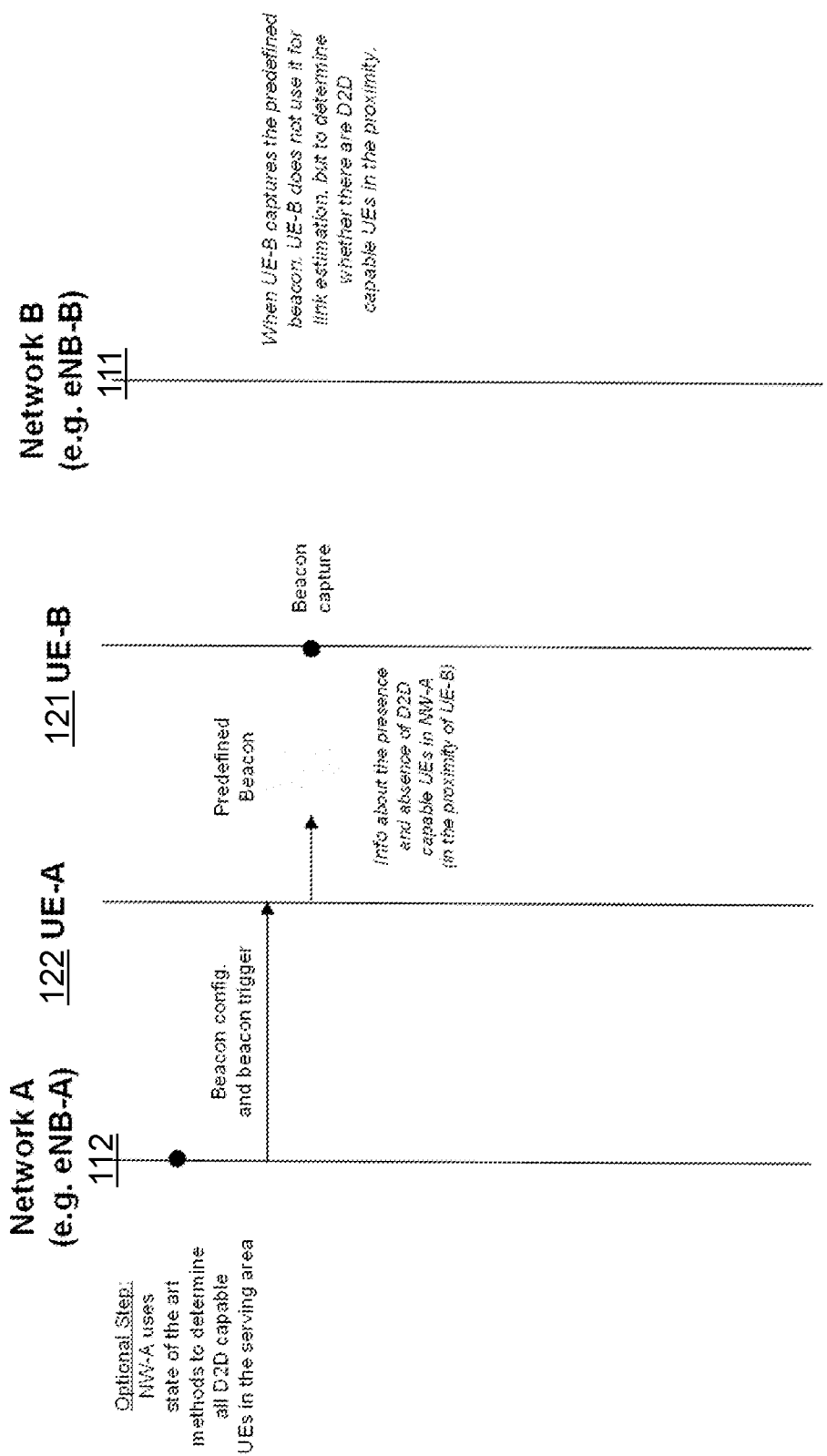
FIG. 10 is a schematic signalling scheme illustrating embodiments herein.

In some embodiments, as depicted in FIG. 10. In these embodiments, rather than the first network node 111 sending a predefined beacon signal, the predefined beacon signal is transmitted by the D2D capable user equipments, in this case the D2D capable second user equipments. Thus, before the first user equipment 121 engages the first network node 111 of the first operator and successively the second network node 112 of the second operator, it scans for this pre-defined beacon. Preferably, such a beacon signal is constructed such that one part is unique for the operator and another part is common for all operators. Suppose that such a beacon signal exist, and furthermore suppose that first user equipment 121 knows the network specific part corresponding to the second operator, which means that the first user equipment 121 knows exactly what this beacon signal looks like. Knowledge of the operator specific part might for instance be obtained already when registering to the first network node 111 of the first operator as part of the neighbour list information. If this pre-defined beacon signal cannot be detected, it is concluded that there is no D2D capable device within range of the first user equipment, and no more action has to be taken. In case the pre-defined beacon in fact is detected, discovery procedure including the two operators is initiated. Also this relates to action 401 above.

Embodiments herein comprises:

A method whereby the first user equipment 121 obtains information about the peer discovery resources used by the second network 102.

A method whereby the first network 102 informs served user equipments about peer discovery resources used by the second network 102.

The method actions performed by the first user equipment 121 and the first network node 111 are performed by functional elements of the processor circuit 310 in the first network node 111, and the processor circuit 510 in the first user equipment 121, see FIGS. 3 and 5. In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware may be configured to execute program code stored in memory. Again, because the various details and engineering tradeoffs associated with the design of processing circuit for user equipments and network nodes are well known and are unnecessary to a full understanding of the invention, additional details are not shown here.

The embodiments herein may, of course, be carried out in other ways than those specifically set forth herein without departing from essential characteristics of the invention. The present embodiments are to be considered in all respects as illustrative and not restrictive.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first network node for handling device discovery of second user equipments in a second network for Device to Device, D2D, communication, wherein the first network node is comprised in a first network, the method comprising:
    obtaining by the first network node within the first network from a second network node within the second network, information about resources for sending device discovery beacon signals in the second network, and
    sending by the first network node to a first user equipment within the first network and served by the first network node, the obtained information about resources for sending device discovery beacon signals in the second network, which information enables the first user equipment to discover beacon signals from the second user equipments in the second network, and/or to send beacon signals to be discovered by the second user equipments in the second network,
    wherein a first operator operates the first network and a second operator, different from the first operator, operates the second network.

2. The method according to claim 1, wherein the information comprises resource description of any of time, frequency and code resources that the second user equipments in the second network use to transmit beacon signals.

3. The method according to claim 1, wherein the information comprises resource description of system frame numbers of frames in which the second user equipments of the second network send beacon signals and specific physical resource blocks of a spectrum of the second network that the second user equipments of the second network use to transmit beacon signals.

4. The method according to claim 1, further comprising:
    receiving at the first network node from the first user equipment a request for discovering second user equipments in the second network.

5. The method according to claim 4, further comprising:
    forwarding to the second network node the request for discovering second user equipments in the second network which request indicates a device identity of the first user equipment.

6. The method according to claim 4, wherein the request specifies the second operator, and wherein the information sent to the first user equipment comprises the second operator's identity and a description of its resources for sending device discovery beacon signals.

7. The method according to claim 1, further comprising:
    sending to the second network node a request for information about resources for sending device discovery beacon signals in the second network.

8. The method according to claim 7, wherein the request for information to the second network node further indicates the number of registered user equipments in the first network that have registered a request for discovering second user equipments in the second network.

9. The method according to claim 1, further comprising:
sending to the second network node, information about the first user equipment listening to discover beacon signals, including the user equipment capabilities of the first user equipment.

10. The method according to claim 1, further comprising:
receiving from the second network node periodic information about the registered second user equipments that are broadcasting beacon signals in the second network, and
based on the received periodic information, sending to the first user equipment, information about the probability that the first user equipment finds a beacon signalling user equipment if the first user equipment decides to listen to beacon signals in the second network.

11. The method according to claim 1, wherein the information about resources for sending device discovery beacon signals in the second network relates to second user equipments that that are in radio range of the first user equipment.

12. A method in a first user equipment for handling device discovery of second user equipments in a second network for Device to Device, D2D, communication, wherein the first user equipment is within a first network and served by a first network node comprised in the first network, the method comprising:
receiving from the first network node, information received by the first network node from a second network node in the second network about resources for sending device discovery beacon signals in the second network, and
listening to beacon signals according to the received information to discover beacon signals from the second user equipments in the second network, or
sending beacon signals according to the received information to be discovered by the second user equipments in the second network,
wherein a first operator operates the first network and a second operator, different from the first operator, operates the second network.

13. The method according to claim 12, wherein the information comprises resource description of any of time, frequency and code resources that the second user equipments in the second network use to transmit beacon signals.

14. The method according to claim 13, wherein the information comprises resource description of system frame numbers of frames in which the second user equipments of the second network send beacon signals and specific physical resource blocks of a spectrum of the second network that the second user equipments of the second network use to transmit beacon signals.

15. The method according to claim 12, further comprising:
sending to the first network node a request for discovering second user equipments in the second network.

16. The method according to claim 15, wherein the request specifies the second operator.

17. The method according to claim 16, wherein the information received from the first network node comprises the second operator's identity and a description of its resources for sending device discovery beacon signals, and wherein sending the beacon signals are performed by repeatedly transmitting the beacon signals according to a pattern.

18. The method according to claim 12, further comprising:
receiving from the first network node, information about the probability that the first user equipment finds a beacon signalling user equipment if the first user equipment decides to listen to beacon signals in the second network.

19. The method according to claim 12, wherein the information about resources for sending device discovery beacon signals in the second network relates to second user equipments that are in radio range of the first user equipment.

20. The method according to claim 12, further comprising:
listening to a second beacon signal from the second network, and which second beacon signal identifies the presence or absence of second user equipments, and when presence of second user equipments has been identified, performing the sending of the request for discovering second user equipments in the second network.

21. The method according to claim 20, wherein the second beacon signal is sent by the second network node, or by the second user equipments in the second network.

22. A first network node for handling device discovery of second user equipments in a second network for Device to Device, D2D, communication, wherein the first network node is comprised in a first network, the first network node comprising a processing circuit configured to:
obtain from a second network node within the second network, information about resources for sending device discovery beacon signals in a second network, and
send to a first user equipment within the first network and served by the first network node, the obtained information about resources for sending device discovery beacon signals in the second network, which information enables the first user equipment to discover beacon signals from the second user equipments in the second network, and/or to send beacon signals to be discovered by the second user equipments in the second network,
wherein a first operator operates the first network and a second operator, different from the first operator, operates the second network.

23. The first network node according to claim 22, wherein the information comprises resource description of any of time, frequency and code resources that the second user equipments in the second network use to transmit beacon signals.

24. The first network node according to claim 22, wherein the information comprises resource description of system frame numbers of frames in which the second user equipments of the second network send beacon signals and specific physical resource blocks of a spectrum of the second network that the second user equipments of the second network use to transmit beacon signals.

25. The first network node according to claim 22, wherein the processing circuit further is configured to receive from the first user equipment a request for discovering second user equipments in the second network.

26. The first network node according to claim 25, wherein the processing circuit further is configured to forward to the second network node the request for discovering second user equipments in the second network which request indicates a device identity of the first user equipment.

27. The first network node according to claim 25, wherein the request specifies the second operator, and wherein the information to be sent to the first user equipment comprises the second operator's identity and a description of its resources for sending device discovery beacon signals.

28. The first network node according to claim 22, wherein the processing circuit further is configured to send to the second network node a request for information about resources for sending device discovery beacon signals in the second network.

29. The first network node according to claim 22, wherein the request for information to be sent to the second network node further indicates the number of registered user equipments in the first network that have registered a request for discovering second user equipments in the second network.

30. The first network node according to claim 22, wherein the processing circuit further is configured to send to the second network node, information about the first user equipment listening to discover beacon signals including the user equipment capabilities of the first user equipment.

31. The first network node according to claim 22, wherein the processing circuit further is configured to receive from the second network node periodic information about the registered second user equipments that are broadcasting beacon signals in the second network, and based on the received periodic information, send to the first user equipment, information about the probability that the first user equipment finds a beacon signalling user equipment.

32. The first network node according to claim 22, wherein the information about resources for sending device discovery beacon signals in the second network relates to second user equipments that are in radio range of the first user equipment.

33. A first user equipment for handling device discovery of second user equipments in a second network for Device to Device, D2D, communication, wherein the first user equipment is within a first network and served by a first network node comprised in the first network, the first user equipment comprising a processing circuit configured to:
receive from the first network node, information received by the first network node from a second network node in the second network about resources for sending device discovery beacon signals in the second network, and
listen to beacon signals according to the received information to discover beacon signals from the second user equipments in the second network, or send beacon signals according to the received information to be discovered by the second user equipments in the second network,
wherein a first operator operates the first network and a second operator, different from the first operator, operates the second network.

34. The first user equipment according to claim 33, wherein the information comprises resource description of any of time, frequency and code resources that the second user equipments in the second network use to transmit beacon signals.

35. The first user equipment according to claim 33, wherein the information comprises resource description of system frame numbers of frames in which the second user equipments of the second network send beacon signals and specific physical resource blocks of a spectrum of the second network that the second user equipments of the second network use to transmit beacon signals.

36. The first user equipment according to claim 33, wherein the processing circuit further is configured to send to the first network node a request for discovering second user equipments in the second network.

37. The first user equipment according to claim 36, wherein the request specifies the second operator.

38. The first user equipment according to claim 37, wherein the information received from the first network node comprises the second operator's identity and a description of its resources for sending device discovery beacon signals, and wherein the processing circuit further is configured to send the beacon signals by repeatedly transmitting the beacon signals according to a pattern.

39. The first user equipment according to claim 33, wherein the processing circuit further is configured to receive from the first network node, information about the probability that the first user equipment finds a beacon signalling user equipment.

40. The first user equipment according to claim 33, wherein the information about resources for sending device discovery beacon signals in the second network relates to second user equipments that that are in radio range of the first user equipment.

41. The first user equipment according to claim 33, wherein the processing circuit further is configured to listen to a second beacon signal from the second network, which second beacon signal identifies the presence or absence of second user equipments, and when presence of second user equipments has been identified, send the request for discovering second user equipments in the second network.

42. The first user equipment according to claim 40, wherein the second beacon signal is to be sent by the second network node, or by the second user equipments in the second network.

43. The method according to claim 1, wherein the first network is configured to operate in different spectrum bands and/or use different radio access technologies than the second network.

44. The method according to claim 5, wherein the device identity of the first user equipment forwarded to the second network node comprises a portion with a value that is specific to the first network.

45. The first network node according to claim 22, wherein the first network is configured to operate in different spectrum bands and/or use different radio access technologies than the second network.

46. The first network node according to claim 26, wherein the device identity of the first user equipment forwarded to the second network node comprises a portion with a value that is specific to the first network.

* * * * *